United States Patent [19]

Granberg

[11] 4,432,421
[45] Feb. 21, 1984

[54] GARDEN TOOL WITH SELF-CLEANING EARTH-WORKING ELEMENTS

[75] Inventor: Elof Granberg, San Rafael, Calif.

[73] Assignee: Granberg Pump & Meter Ltd., Richmond, Calif.

[21] Appl. No.: 302,935

[22] Filed: Sep. 16, 1981

[51] Int. Cl.³ .............................................. A01B 1/20
[52] U.S. Cl. ................................ 172/375; 56/400.08; 56/400.16; 172/378
[58] Field of Search .............. 172/371, 372, 373, 374, 172/375, 376, 377, 378; 56/400.16, 400.19, 56/400.2, 400.08

[56] References Cited

U.S. PATENT DOCUMENTS

| 725,768 | 4/1903 | Prevost | 172/373 |
|---|---|---|---|
| 1,182,153 | 5/1916 | Ellwein | 56/400.04 |
| 1,182,451 | 5/1916 | Bradley, Jr. | 172/375 |
| 1,276,915 | 8/1918 | Hinkle | 56/400.16 |
| 1,612,894 | 1/1927 | Thompson | 56/400.2 |
| 1,632,883 | 6/1927 | Carkey | 172/375 |
| 1,832,358 | 11/1931 | Bruck | 56/400.2 X |
| 1,972,727 | 9/1934 | Zimmermann | 172/378 |
| 2,119,165 | 5/1938 | Hornstein | 56/400.2 |
| 2,597,954 | 5/1952 | Schaller | 172/375 |
| 2,737,101 | 10/1950 | Hutchins | 172/375 X |
| 2,767,545 | 2/1951 | Jenkins | 56/400.06 |

FOREIGN PATENT DOCUMENTS

| 218777 | 7/1924 | United Kingdom | 56/400.16 |
|---|---|---|---|
| 735273 | 8/1958 | United Kingdom | |

Primary Examiner—Richard T. Stouffer
Attorney, Agent, or Firm—Townsend and Townsend

[57] ABSTRACT

A garden tool which allows the user to rake, cultivate, thatch, weed and aerate the soil is disclosed. The tool comprises a handle and a work head which includes a number of partially rotatable earth-working elements. One end of each element is specifically adapted to travel the surface of the soil to sever weeds and to cultivate and aerate the soil. The opposite end of each element is adapted to act as a rake for raking and thatching grass lawns. The rake side of the tool can also be used to weed, cultivate and aerate by causing the tips of the elements to penetrate the soil and work it loose.

3 Claims, 9 Drawing Figures

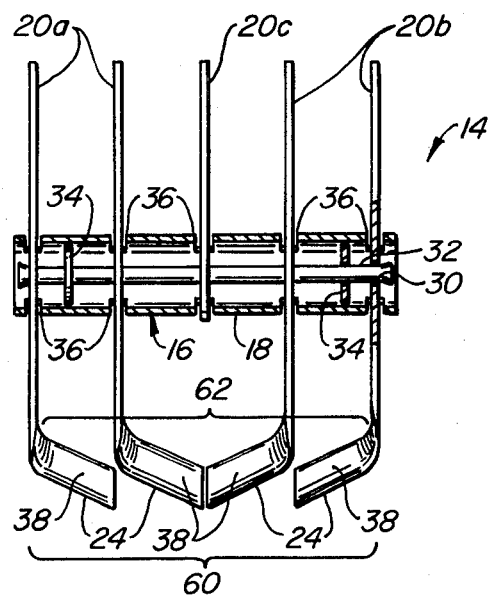
FIG._2.
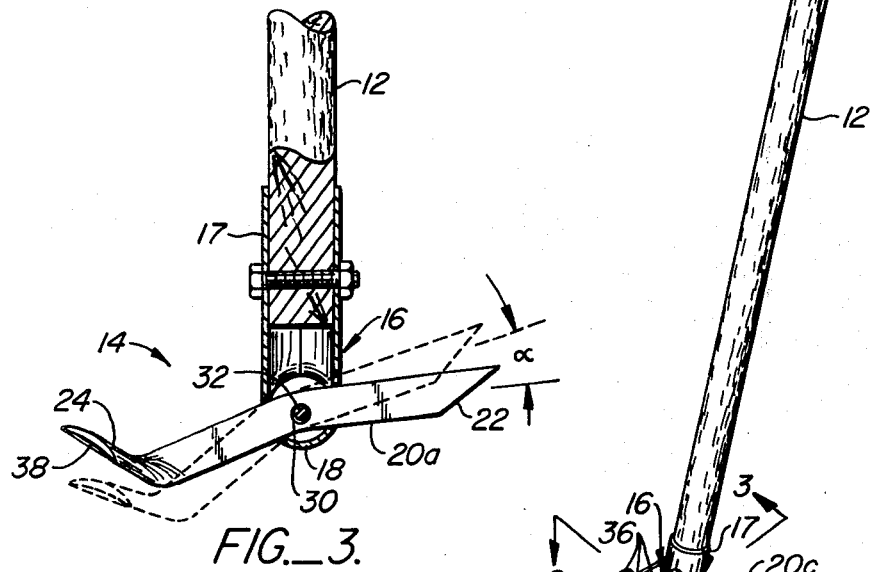
FIG._3.
FIG._1.

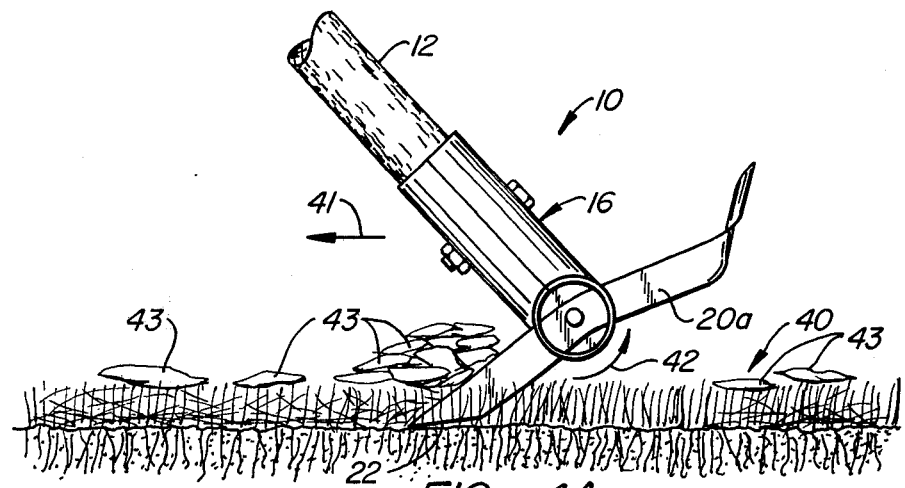
FIG._4A.
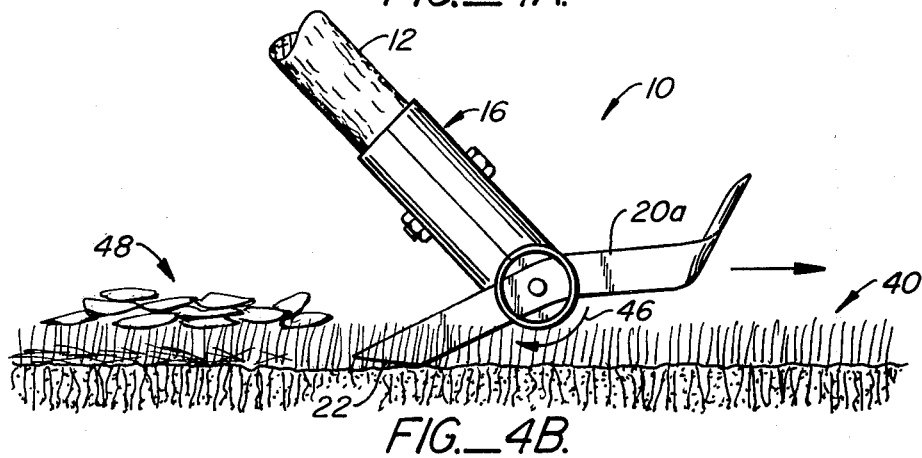
FIG._4B.
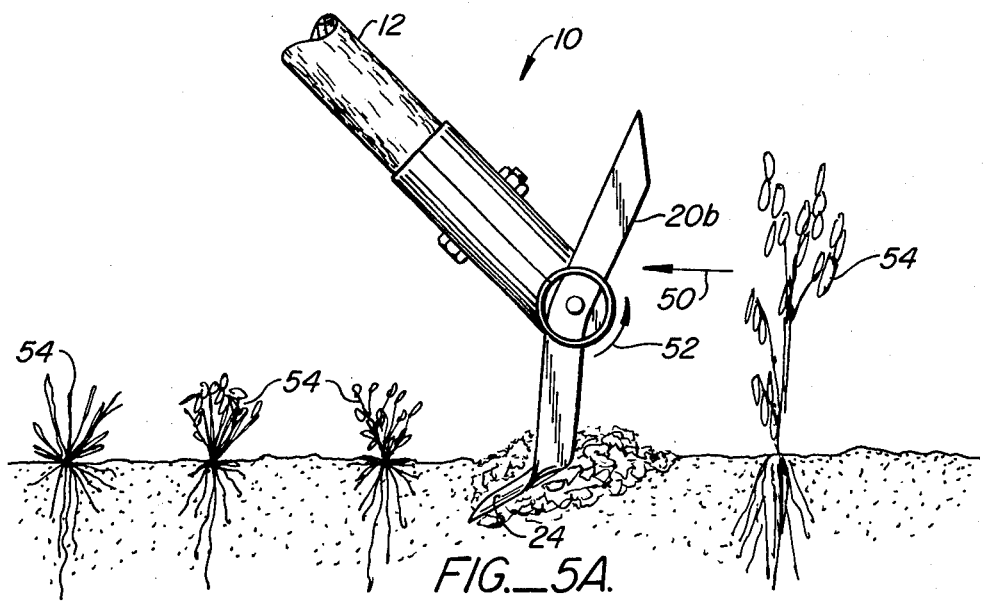
FIG._5A.

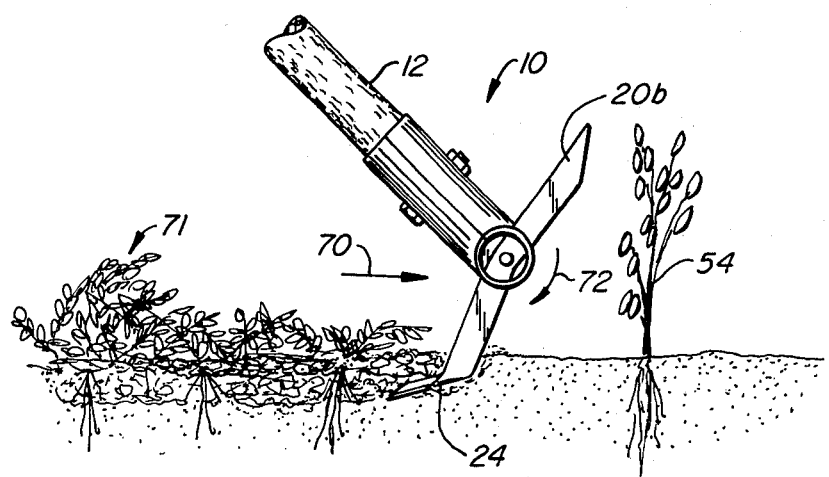
FIG._5B.
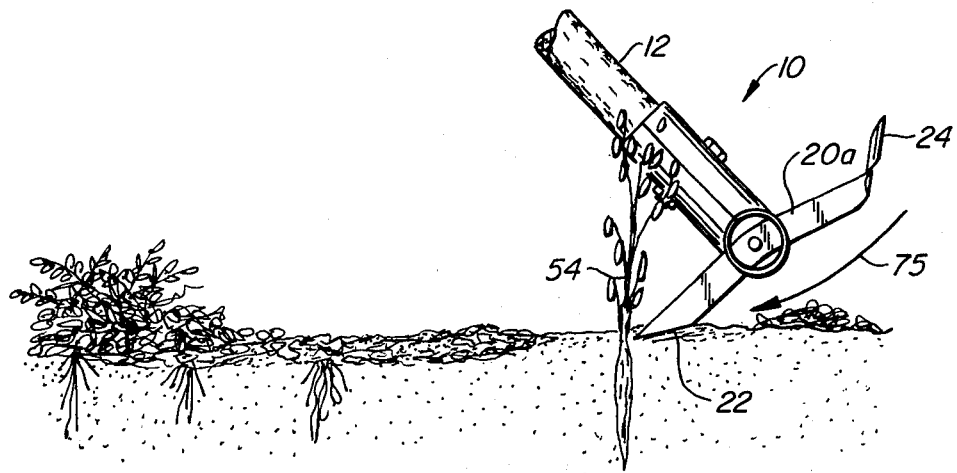
FIG._5C.
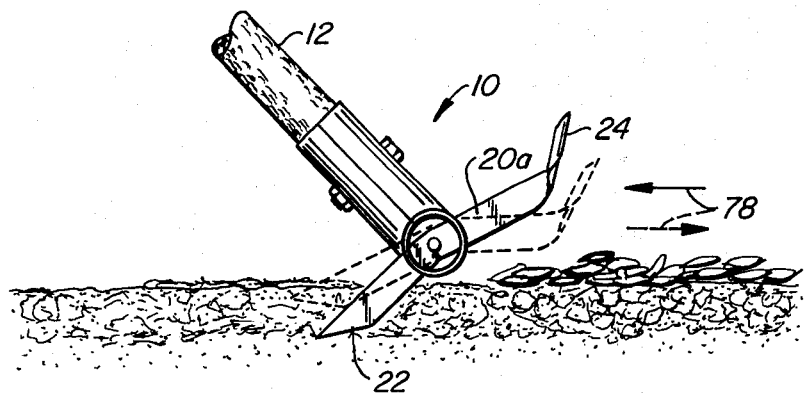
FIG._5D.

GARDEN TOOL WITH SELF-CLEANING EARTH-WORKING ELEMENTS

BACKGROUND OF THE INVENTION

1. Field of the Invention

The present invention relates generally to garden tools, and more particularly it relates to a single tool capable of performing a variety of tasks in the garden, including raking, hoeing, cultivating, thatching, weeding and aerating.

2. Description of the Prior Art

Tools to perform specific tasks in the garden are well known in the prior art. Rakes, comprising a plurality of straight or bent tines, can be used to remove dead grass and accumulated debris from between living grass plants (thatching) as well as for raking loose material from the surface (raking). Hoes, comprising a flat blade angled downward from the lower end of the handle, can be used for hoeing (weeding), and turning-over the soil (cultivating, aerating).

Various attempts have been made over the years to improve upon the basic design of both the rake and the hoe. See, for example, British Pat. No. 735,273 which discloses a hoe comprising a horizontal blade capable of swinging forward and back as the hoe is moved through the ground; U.S. Pat. No. 2,767,545 which discloses a combination cultivator and rake; U.S. Pat. No. 2,737,101 which discloses a cultivator including a plurality of fixed horizontal blades adapted to travel beneath the surface of the group to break up the soil; U.S. Pat. No. 2,597,954 which discloses a rake having both sharpened and blunt tines projecting from opposite sides of the tool; U.S. Pat. No. 1,632,883 which discloses an implement including tines projecting from one side and a hoe having a serrate edge projecting from the other; U.S. Pat. No. 1,182,153 which discloses a rake having swingable rake blades; U.S. Pat. No. 1,182,451 which discloses a rake including both raking tines and cutting blades for severing weeds; and U.S. Pat. No. 1,276,915 which discloses a rake having relatively wide teeth terminating in a beveled or sharpened end.

SUMMARY OF THE INVENTION

The present invention is a single tool capable of performing a variety of garden tasks including raking, hoeing, cultivating, thatching, weeding, aerating and the like. It accomplishes this by providing a specially adapted work head having a plurality of earth-working elements projecting therefrom on both sides of the tool. On one side of the tool, the earth-working elements terminate in a point and act as tines for raking, thatching, cultivating and aerating. On the other side of the tool, the same earth-working elements terminate in flanged blades which together present a substantially continuous, horizontal cutting edge when the tool is drawn through the earth. The cutting blades have cutting edges on both sides, and the cutting edges typically are oriented obliquely to the direction of travel through the soil. The cutting blades may be used for hoeing (weeding), cultivating and aerating.

The action of both the tined side of the tool and the bladed side of the tool is enhanced by the ability of the earth-working elements to rotate through a small arc about the transverse axis of the tool head. Such rotation allows the rake tines to discharge material gathered on the back stroke (toward the user) as the tool is pushed forward. In this way, the well-known tendency of rakes to become mired in the material being raked (e.g., leaves) is avoided. Moreover, the ability to rotate allows the cutting blades to assume the proper angle-of-attack to sever weeds both when the tool is moved in the forward direction and when it is moved in the backward direction.

In the preferred embodiment, the cutting head comprises a cylinder mounted transversely at one end of a handle. The earth-working elements are mounted through slots in the cylinder and secured on a common axle. The dimensions of the slots allows each of the elements to rotate through the same arc, typically 15°, relative to the orientation of the handle.

A particular advantage of the segmented construction of the cutting blade is that it is self-cleaning. When the direction of the tool is reversed, the segments of the blade briefly move apart allowing much of the gathered material to be released from the blades. During the cutting stroke, however, the action of the earth on the blades tends to draw them together to present a substantially continous cutting edge to the weeds.

An additional advantage of the present invention is that the oblique orientation of the cutting blades facilitates the severing of weeds. A blade which is advanced with the cutting edge perpendicular to the line of travel is less able to cut a weed or other object than a blade which is angled away from the perpendicular.

Finally, the invididual blades may be provided with convex lower surfaces, which render the blades "self-sharpening". The grinding action of the soil on the convex surfaces tends to hone rather than dull the blade.

The novel features which are characteristic of the invention as to organization and method of operation, together with further objects and advantages thereof, will be better understood from the following description considered in connection with the accompanying drawings, in which a preferred embodiment of the invention is illustrated by way of example. It is to be expressly understood, however, that the description and the drawings are for the purposes of illustration only and are not intended as a definition of the limits of the invention.

BRIEF DESCRIPTION OF THE DRAWINGS

FIG. 1 is a perspective view of the garden tool of the present invention.

FIG. 2 is a sectional view of the tool head taken along line 2—2 of FIG. 1.

FIG. 3 is an elevational view of the tool head taken along line 3—3 of FIG. 1.

FIGS. 4A-4B illustrate the use of the garden tool of the present invention in raking and thatching.

FIGS. 5A-5D illustrate the use of the garden tool of the present invention in weeding, cultivating and aerating.

DESCRIPTION OF THE PREFERRED EMBODIMENT

The following terms, as defined, will be used throughout the specification:

Raking—To gather loose material from a surface, such as gathering leaves fallen on a lawn, as with a rake.

Hoeing—To weed or dig up, as with a hoe

Cultivating—To loosen soil around growing plants.

Thatching—To loosen and gather dead and matted growth from between living grass plants.

Aerating—To turn over and loosen soil to expose the soil to air.

Referring to FIGS. 1, 2 and 3, a garden tool 10 comprises a handle 12 and tool head 14. The handle 12 may have various lengths, and is illustrated in FIG. 1 at a length suitable for use by a user in a standing position. A much shorter handle would be provided for working in a kneeling or croutching position.

The tool head 14 comprises a T-shaped bracket 16 having a shank 17 rigidly secured to the lower end of the handle 12 and a cross member 18 which lies perpendicularly to the axis of the handle. The tool head 14 further includes a plurality of earth-working elements 20 rotatably secured to the cross member 18 of the bracket 16 in a manner which will be described in more detail hereinafter.

The earth-working elements 20 have three different forms. A first form 20a is an elongate flat plate terminating at one end in a tapered point 22 (best illustrated in FIG. 3) and terminating at the other end in a sharpened blade or flange 24 (best illustrated in FIGS. 1 and 2). A second form 20b of the blade 26 is a mirror image of the first form 20a, including both the tapered end 22 and the blade 24 with the blade directed in the opposite direction. The elements 20a,20b are mounted on the bracket 16 so that the blades 24 are aligned with one another to form two substantially continuous cutting edges which lie transverse to the handle 12 and comprise the "hoe" side of the tool.

A third form 20c of the earth-working elements 20 only the portion terminating in a tapered point. The element 20c is mounted between the blades 20a, 20b and projects outward in the same direction as the tapered ends 22 of said other elements.

Each of the earth-working elements 20 includes a hole 30 (FIGS. 2 and 3) for receiving a rod 32 therethrough. The rod 32, in turn, is received through a pair of discs 34 each having a diameter approximately equal to the inner diameter of the cross member 18. The discs 34 support the rod 32 so that the rod lies substantially along the axis of the cross member 18. The earth-working elements 20 project through slots 36 formed through opposite sides of the cylindrical wall of cross member 18. Each of the slots 36 subtends an arc slightly greater than the width of the earth-working element 20. In this way, the earth-working element is able to rotate through an angle 4, (FIG. 3), typically 15°. The ability of the elements 20 to swing through a small angle enhances the operation of the tool as will be described in more detail hereinafter. Each of the slots 36 is aligned so that the movement of the earth-working elements 20 relative to the tool head head 14 and handle 12 is the same.

The blade portions 24 of the earth-working elements 20 each have a concave lower surface 38 (that is, the surface on the side opposite to the bracket 16, as best seen in FIG. 3) which causes the blades to be self-sharpening. The hollow area formed on the bottom allows the grinding action resulting from contact with the earth to further hone the blade 24, rather than causing the blade to become dull.

Each of the earth-working elements 20 are slightly bent near the hole 30 so that both sides will be in proper orientation when the tool 10 is in use. The degree of bending, approximately 15° in the embodiment illustrated, is chosen so that both the tines 22 and the blades 24 will have the proper angle-of-attack when the tool 10 is used, as described in more detail hereinafter.

Referring now to FIGS. 4A and 4B, the action of the tined side of the tool 10 in raking and thatching a grass lawn 40 will be described. The user (not shown) will typically hold the handle 12 at approximately at 45° angle with the ground. Thus, when the raking with the straight tines of the elements 20, the tapered surface 22 will lie approximately parallel to the surface of the ground. On the backstroke (i.e. the direction of the arrow 41 in FIG. 4A) the tapered points 22 will drag along the ground, tending to rotate the elements 20 in the counter-clockwise direction, as indicated by arrow 42. Rotation of the elements 20, of course, is limited by the extent of the slots 36 and the relative orientation of the elements to the bracket 16 will be as shown in FIG. 4A. While being pulled toward the user, the tools act as a rake gathering loose leaves 43 at or near the top of the grass and further acts as a thatcher as the pointed tips, which are inclined slightly downward, penetrate through the healthy grass down to a matter layer 44 of dead grass. In this way, the dead grass can be removed to promote the growth of new lawn.

After completing the backstroke, the user merely pushes the tool 10 forward (as indicated by arrow 44 in FIG. 4B) which causes the elements 20 to rotate clockwise (arrow 46) a small degree which in turn causes the leaves and other debris gathered to disengage the tines and stay behind in a pile 48.

Referring now to FIGS. 5A–5B, the operation of the garden tool 10 in cultivating, weeding, and aerating will be described. Use of the bladed side of the tool 10 is preferred for weeding. In FIG. 5A, the tool 10 is being drawn toward the user in the direction of (arrow 50) with the flanged blades 24 lying just below the surface and inclined somewhat downward. The orientation of the blades 24 will remain substantially constant during the backstroke with the earth-working elements 20 being fully rotated in the counter-clockwise direction (arrow 52). As the blades 24 are drawn through the soil, they encounter and sever the weeds 54 a short distance below the surface of the soil. Moreover, the blades 24 will cultivate and aerate the top layer of the soil by breaking it apart and turning it over. If desired, the user may work the blades 24 back and forth and downward to a lower level to additionally cultivate the soil.

Referring back to FIGS. 1 and 2, it can be seen that the blades 24 together define a pair of segmented cutting edges 60, 62, one edge lying on each side of the blades. Each of the blades 24 lies at an oblique angle (relative to the direction which the tool 10 will be drawn through the soil) so that each cutting edge comprises four angled segments. Such angled blades provide three particular advantages. First, an angled blade is more able to cut weeds than a blade which is advanced perpendicularly to the line of travel. Second, the segments which are able to separate when encountering a particularly large weed, allow the weed to pass. Such large weeds may then be removed by other means, including the rake side of the tool, as described hereinafter. Finally, the individual blades tend to briefly separate as the direction of motion through the soil is reversed. Such momentary separation releases weeds which would otherwise remain entangled in the blades 24.

FIG. 5B illustrates the situation after the tool 10 has been drawn toward the user a sufficient distance to sever the weeds 54 lying in its path. The tool 10 may then be pushed away (arrow 70) by the user, leaving a pile of weeds 71 as the blades 24 momentarily separate. Since the flanged blades 24 are sharpened on both sides, they are able to sever remaining weeds and cultivate going in either direction. As shown in FIG. 5B, the user can push the tool 10 forward to sever the large remaining weed 54.

On the forward stroke (FIG. 5B, arrow 70), the elements 20 rotate in the clockwise direction (arrow 72) to the extent possible, changing the inclination of the blades 24 relative to the ground. As illustrated in FIG. 5B, the blades 5B are inclined upward as the tool 10 is pushed away from the user and the blades will normally not penetrate further into the ground. If it is desired to aerate or cultivate deeply into the soil, the user may raise the handle 10 somewhat and cause the blades 24 to be directed downward. In this way, the blades 24 will penetrate deeper into the soil on both the forward and return strokes.

In some instances a weed may be so large that it is difficult to sever with the cutting blades 24. In that case, the rake side of the tool 10 may be used to dig out or sever the weeds as shown in FIG. 5C. There the user is using the tool 10 with the same action that one would use a hoe in hacking out the weed with strokes in the direction of arrow 75. Often, the tapered ends 22 of the elements 20 are able to penetrate beneath the weed 54 and allow the user to pull the weed out, root and all, by pulling on the handle 12 of the tool 10.

Finally, the rake side of the tool 10 may be used to cultivate and aerate the soil, as shown in FIG. 5D. The user places sufficient pressure on the tool 10 so that the tapered ends 22 of the elements 20 penetrate into the soil as the user draws the tool forward and back in the direction of arrows 78. On the backstroke (toward the user), the elements 20 are in the position shown in the full line. The tips 22 of the elements are inclined to penetrate the soil and maximum working of the earth is obtained. On the forward stroke, the elements 20 rotate in the clockwise direction (as illustrated in broken line) and the tip 22 is no longer inclined to penetrate the earth. Instead, the elements 20 return through the ground broken on the backstroke and thereafter are ready to again be pulled toward the user for further penetration.

While the preferred embodiment is illustrated in detail it is apparent that modifications and adaptations of that embodiment will occur to those skilled in the art. However, it is to be expressly understood that such modification and adaptations are within the spirit and scope of the present invention, as set forth in the following claims.

What is claimed is:

1. A garden tool for raking and thatching surface materials and cutting weeds and cultivating below the surface of the soil, said tool comprising:
   an elongate handle;
   a tubular cross member secured perpendicular to one end of the handle, said cross member having a plurality of aligned paired slots disposed along the length of the member, the slots of each pair being coplanar and spaced 180° apart;
   a rod centered within the tubular cross member; and
   a plurality of earth-working elements rotatably attached to the rod and independently rotatable with respect to said rod, each of the elements passing through a pair of the slots in the cross member which are so dimensioned as to permit but limit the rotation of the respective one of the elements with respect to the other of the elements, rotation of the elements being otherwise unconstrained, each of the elements including a pointed tine at one end and a laterally inclined blade at the other, the blades of adjacent elements being substantially contiguous, the tined ends of the elements being used for raking and thatching with the limited rotation permitted for the elements being of a sufficiently significant angle as to provide self-cleaning of the elements on the backstroke by permitting the elements to briefly move apart from each other, the blades being used for subsurface weeding and cultivation with the limited rotation allowing large weed stalks to slip between the blades and cleaning the blades when the direction of motion is reversed.

2. The garden tool of claim 1 wherein the slots limit rotation of the elements to approximately 15°.

3. The garden tool of claim 1 wherein the tined ends have a flat cross section tapering to a point at the tip.

* * * * *